United States Patent [19]
Blaner et al.

[11] Patent Number: 5,386,531
[45] Date of Patent: Jan. 31, 1995

[54] COMPUTER SYSTEM ACCELERATOR FOR MULTI-WORD CROSS-BOUNDARY STORAGE ACCESS

[75] Inventors: Bartholomew Blaner, Newark Valley; Raymond J. Eberhard, Endicott; Thomas L. Jeremiah, Endwell; Michael J. Mack, Endicott, all of N.Y.

[73] Assignee: International Business Machines Corporation, Armonk, N.Y.

[21] Appl. No.: 700,732

[22] Filed: May 15, 1991

[51] Int. Cl.⁶ .................. G06F 12/04; G06F 12/06
[52] U.S. Cl. .................. 395/425; 395/375; 364/239; 364/254
[58] Field of Search .............. 395/375, 250, 400, 425

[56] References Cited

U.S. PATENT DOCUMENTS

| | | | |
|---|---|---|---|
| 3,602,896 | 8/1971 | Zeheb . | |
| 3,916,388 | 10/1975 | Shimp et al. | 395/250 |
| 4,189,772 | 2/1980 | Liptay . | |
| 4,435,792 | 3/1984 | Bechtolsheim | 365/230 |
| 4,449,185 | 5/1984 | Oberman et al. . | |
| 4,502,115 | 2/1985 | Eguchi . | |
| 4,520,439 | 5/1985 | Liepa . | |
| 4,814,976 | 3/1989 | Hansen et al. . | |
| 4,823,302 | 4/1989 | Christopher | 395/425 |
| 4,868,553 | 9/1989 | Kawamata | 340/731 |
| 4,888,687 | 12/1989 | Allison et al. . | |
| 5,168,561 | 12/1992 | Vo | 395/425 |

OTHER PUBLICATIONS

IBM TDB, vol. 29, No. 12, May 1987 L. J. LaBalbo et al.
IBM TDB, vol. 32, No. 2, Jul. 1989, G. F. Grohoski et al.
IBM TDB, vol. 20, No. 9, Feb. 1978, C. D. Holtz et al.
IBM TDB, vol. 25 No. 7A, Dec. 1982, A. Y. Ngai et al.
Technical Newsletter No. SN22-5279, Apr. 17, 1989, S370-01.

*Primary Examiner*—Parshotam S. Lall
*Assistant Examiner*—Ayni Mohamed
*Attorney, Agent, or Firm*—Lynn L. Augspurger

[57] ABSTRACT

An instruction processing unit (IPU) and a storage array, a storage-to-instruction-processing-unit interface, including a hardware accelerator for cross-boundary storage access with a cross-boundary buffer for providing residual read and write data in support of high speed block concurrent accessing of multi-word operands of a computer system. A cross-boundary buffer (CBB) is used, coupled to a write rotating shifter, a write merger (WMERGE) and a write merge controller (WMCTL) which is coupled for an input to said control register (CREG) for sequencing data transmitted on the data bus for merger with data contained in the cross-boundary buffer (CBB) by the write merger before it is latched in a data bus out register, and for simultaneously also latching the data in the cross-boundary buffer (CBB), and for writing data from the data bus out register into the storage array in the next clock cycle of the instruction processor at the doubleword address addressed. The cross-boundary buffer (CCB) is also coupled to a read rotating shifter (RROTATE), a read merger (RMERGE) and a read merge controller which responds to control instruction sequencing. The storage-to-instruction-processing-unit interface operates on multiple words, with residues from a second and subsequent accesses allowing continuation of the accessing process beyond two memory words. The hardware can repeat a second microword until an operand of arbitrary length is transferred. The interface permits efficient data transfer to be interrupted and resumed at a desired point, for efficient execution of Load Multiple and Store Multiple operations.

23 Claims, 17 Drawing Sheets

| CYCLE | 1 | 2 | 3 | 4 | 5 |
|---|---|---|---|---|---|
| LM – WORD 1 | ID | AG | EX | PA | |
|        WORD 1 | | | AG | EX | PA |
| ABUS(28:31) HEX | | 04 | 0C | | |
| LEN | | 7 | 7 | | |
| W2 | | 7 | 7 | | |
| DBUSIN(0:31) | | | | abcd | |
| DBUSIN(32:63) | | | | efgh | |
| CBB(0:31) | | | | ––– | |
| CBB(32:63) | | | | abcd | |
| READ | | 1 | 1 | | |
| WRITE | | 0 | 0 | | |
| SAVE | | 1 | 1 | | |
| MERGE | | 0 | 1 | | |
| DIREG(0:31) | | | | | abcd |
| DIREG(32:63) | | | | | efgh |

FIG.13

| CYCLE | 1 | 2 | 3 | 4 | 5 | 6 |
|---|---|---|---|---|---|---|
| LM – WORD 1 | ID | AG | EX | PA | | |
|        WORD 1 | | | AG | EX | PA | PA |
|        WORD 2 | | | | AG | EX | |
| ABUS(28:31) HEX | | 01 | 09 | 11 | | |
| LEN | | 7 | 7 | 7 | | |
| W2 | | 15 | 15 | 7 | | |
| DBUSIN(0:31) | | | | abcd | ijkl | |
| DBUSIN(32:63) | | | | efgh | mnop | |
| CBB(0:31) | | | | –abc | hijk | |
| CBB(32:63) | | | | defg | lmno | |
| READ | | 1 | 1 | 1 | | |
| WRITE | | 0 | 0 | 0 | | |
| SAVE | | 1 | 1 | 1 | | |
| MERGE | | 0 | 1 | 1 | | |
| DIREG(0:31) | | | | | abcd | ijkl |
| DIREG(32:63) | | | | | efgh | mnop |

FIG.14

| CYCLE | 1 | 2 | 3 | 4 | 5 | 6 |
|---|---|---|---|---|---|---|
| LM — WORD 1 | ID | AG | EX | PA | | |
| WORD 1 | | | AG | EX | PA | PA |
| WORD 2 | | | | AG | EX | |
| ABUS(28:31) HEX | | 01 | 09 | 11 | | |
| LEN | | 7 | 7 | 3 | | |
| W2 | | 11 | 11 | 3 | | |
| DBUSIN(0:31) | | | | abcd | ijkl | |
| DBUSIN(32:63) | | | | efgh | ———— | |
| CBB(0:31) | | | | —abc | hijk | |
| CBB(32:63) | | | | defg | lmno | |
| READ | | 1 | 1 | 1 | | |
| WRITE | | 0 | 0 | 0 | | |
| SAVE | | 1 | 1 | 1 | | |
| MERGE | | 0 | 1 | 1 | | |
| DIREG(0:31) | | | | | abcd | ijkl |
| DIREG(32:63) | | | | | efgh | ———— |

FIG.15

| CYCLE | 1 | 2 | 3 | 4 | 5 |
|---|---|---|---|---|---|
| LM — WORD 1 | ID | AG | EX | PA | |
| WORD 2 | | | AG | EX | PA |
| ABUS(28:31) HEX | | 0 | 8 | | |
| LEN | | 7 | 7 | | |
| W2 | | 15 | 7 | | |
| DBUSIN(0:31) | | | abcd | ijkl | |
| DBUSIN(32:63) | | | efgh | mnop | |
| CBB(0:31) | | | | abcd | ijkl |
| CBB(32:63) | | | | efgh | mnop |
| READ | | 1 | 1 | | |
| WRITE | | 0 | 0 | | |
| SAVE | | 1 | 1 | | |
| MERGE | | 0 | 1 | | |
| DIREG(0:31) | | | | abcd | ijkl |
| DIREG(32:63) | | | | efgh | mnop |

FIG.16

| CYCLE | 1 | 2 | 3 | 4 | 5 |
|---|---|---|---|---|---|
| STM — WORD 1 | ID | AG | EX | | |
| WORD 1 | | | AG | EX | |
| ABUS(28:31) HEX | | 06 | 0E | | |
| LEN | | 3 | 3 | | |
| W2 | | 3 | 3 | | |
| DBUSOUT(0:31) | | | cd-- | cd-- | |
| DBUSOUT(32:63) | | | --ab | --ab | |
| CBB(0:31) | | | | cd-- | |
| CBB(32:63) | | | | --ab | |
| DOREG(0:31) | | | | ---- | cd-- |
| DOREG(32:63) | | | | --ab | ---- |
| READ | | 0 | 0 | | |
| WRITE | | 1 | 1 | | |
| SAVE | | 1 | 1 | | |
| MERGE | | 0 | 1 | | |

FIG.17

| CYCLE | 1 | 2 | 3 | 4 | 5 | 6 |
|---|---|---|---|---|---|---|
| STM — WORD 1 | ID | AG | EX | | | |
| WORD 2 | | | AG | EX | | |
| WORD 2 | | | | AG | EX | |
| ABUS(28:31) HEX | | 04 | 0C | 14 | | |
| LEN | | 3 | 7 | 3 | | |
| W2 | | 15 | 11 | 3 | | |
| DBUSOUT(0:31) | | | efgh | mnop | xxxx | |
| DBUSOUT(32:63) | | | abcd | ijkl | xxxx | |
| CBB(0:31) | | | | efgh | mnop | |
| CBB(32:63) | | | | abcd | ijkl | |
| DOREG(0:31) | | | | ---- | efgh | mnop |
| DOREG(32:63) | | | | abcd | ijkl | ---- |
| READ | | 0 | 0 | 0 | | |
| WRITE | | 1 | 1 | 1 | | |
| SAVE | | 1 | 1 | 1 | | |
| MERGE | | 0 | 1 | 1 | | |

FIG.18

| CYCLE | 1 | 2 | 3 | 4 | 5 | 6 |
|---|---|---|---|---|---|---|
| STM – WORD 1 | ID | AG | EX | | | |
| WORD 2 | | | AG | EX | | |
| WORD 2 | | | | AG | EX | |
| ABUS(28:31) HEX | | 04 | 0C | 14 | | |
| LEN | | 3 | 7 | 7 | | |
| W2 | | 19 | 15 | 7 | | |
| DBUSOUT(0:31) | | | efgh | mnop | xxxx | |
| DBUSOUT(32:63) | | | abcd | ijkl | qrst | |
| CBB(0.31) | | | | efgh | mnop | |
| CBB(32:63) | | | | abcd | ijkl | |
| DOREG(0:31) | | | | ---- | efgh | mnop |
| DOREG(32:63) | | | | abcd | ijkl | qrst |
| READ | | 0 | 0 | 0 | | |
| WRITE | | 1 | 1 | 1 | | |
| SAVE | | 1 | 1 | 1 | | |
| MERGE | | 0 | 1 | 1 | | |

FIG.19

| CYCLE | 1 | 2 | 3 | 4 | 5 | 6 |
|---|---|---|---|---|---|---|
| STM – WORD 1 | ID | AG | EX | | | |
| WORD 2 | | | AG | EX | | |
| ABUS(28:31) HEX | | 00 | 08 | | | |
| LEN | | 7 | 3 | | | |
| W2 | | 11 | 3 | | | |
| DBUSOUT(0:31) | | | abcd | ijkl | | |
| DBUSOUT(32:63) | | | efgh | ---- | | |
| CBB(0.31) | | | | abcd | | |
| CBB(32:63) | | | | efgh | | |
| DOREG(0:31) | | | | abcd | ijkl | |
| DOREG(32:63) | | | | efgh | ---- | |
| READ | | 0 | 0 | | | |
| WRITE | | 1 | 1 | | | |
| SAVE | | 1 | 1 | | | |
| MERGE | | 0 | 1 | | | |

FIG.20

COMPUTER SYSTEM ACCELERATOR FOR MULTI-WORD CROSS-BOUNDARY STORAGE ACCESS

FIELD OF THE INVENTION

This invention relates to computer systems and particularly to an accelerator system employing hardware with microcode for increasing the performance of multi-word cross-boundary storage accesses.

BACKGROUND OF THE INVENTION

Processor storage arrays, ranging from smaller high-speed caches to large, comparatively low-speed random access memories (RAM), are commonly organized on an n-word basis where a word is some number of consecutive bytes representing the basic unit of computation for a processor, and n is a positive integer. A storage access, by definition, references one n-word. This organization allows for efficient busing structures between the processor and storage and simplifies addressing the storage arrays, which may be composed of many individually-addressable storage arrays. For example, in the S/370 architecture, as illustrated by the IBM Corporation publication entitled "The ESA/370 CPU Architecture", published 1989, SA22-7200, the 8-bit byte is the smallest unit of addressable storage, and 4 consecutive bytes constitute a word—the basic unit of computation. Present day S/370 processors have storage arrays organized on 2-word (doubleword or DW) and 4-word (quadword or QW) boundaries.

One example of a possible S/370 processor development dealing with operands which are not aligned on n-word boundaries is the operand fetch logic illustrated by U.S. Pat. No. 4,189,772 to Liptay issued Feb. 19, 1980 entitled "Operand Alignment Controls for VFL Instructions".

Another patent in the general area is U.S. Pat. No. 3,602,896, issued Aug. 31, 1971 to D. Zaheb entitled "Random Access Memory with Flexible Data Boundaries" which discloses a random access memory where an accessed data word may overlap one memory word boundary into an adjacent memory word. The initial byte location is provided along with a number of bytes (up to one word length).The partitioning of the cache required by the disclosure imposes unacceptable circuit delay in the cache access critical path.

Yet another patent in the general area is U.S. Pat. No. 4,435,792 issued Mar. 6, 1984 to Bechtolsheim entitled "Raster Memory Manipulation Apparatus" wherein a computer can access memory over word boundaries. A shifter and offset data (i.e. length of access and boundary) are used to align the data, but again the partitioning necessitates placing an incrementer, multiplexer, and decoder in the main memory address path which imposes unacceptable delays.

These kinds of additions in the main memory address path are imposed in U.S. Pat. No. 4,520,439 issued May 28, 1985 to Liepa about "Variable Field Partial Write Data Merge" which discloses accessing memory and crossing over word boundaries by providing a starting address, read/write information, start location and access length. Words across word boundaries are merged with not needed bits being masked using a write data interface. This bit masking approach is unrelated to our work.

U.S. Pat. No. 4,814,976 issued Mar. 21, 1989 disclosed a "RISC Computer with Unaligned Reference Handling and Method for the Same" wherein is shown accessing across boundaries of a cache memory using a shift/merge unit which requires explicit coding in order to handle off-boundary accesses, while U.S. Pat. No. 4,814,553 issued Sep. 19, 1989 to Kawamata related to a "Raster Operation Device" which shows a way of crossing word boundaries based on shift width, bit width of data of a raster screen display. No provision here was made for data fetching, retaining a residue of the second word accessed in the read-modify-write operation, and other features required for cross storage boundary accesses of a computer memory.

Other art in the general field but thought unrelated to our own developments includes U.S. Pat. No. 4,449,185, issued May 15, 1984 to Oberman et al, which related to the "Implementation of Instructions for a Branch which can Cross One Page Boundary"; U.S. Pat. No. 4,502,115 issued Feb. 26, 1985 to Eguchi which related to a "Data Processing Unit of a Microprogram Control System for Variable Length Data"; U.S. Pat. No. 4,888,687 issued Dec. 19, 1989 to Allison et al relating to a "Memory Control System" which is not directed to high speed accesses which can handle block concurrent stores and accesses.

Within IBM, as shown by the IBM Technical Disclosure Bulletin, Vol. 25 No. 7A, December 1982, A. Y. Ngai and C. H. Ngai proposed "Boundary Crossing with a Cache Line". The Ngais' publication included a byte shifter for data alignment, pp. 3540. This technical disclosure facilitates cross-boundary fetching by partitioning the cache memory into two segments, A and B, which are basically even and odd addressed arrays. This partitioning necessitates placing an incrementer and multiplexer on the segment A cache address and multiplexers on the outputs of the cache arrays. As we have said, such partitioning runs counter to our developments since additional circuit delay is added to the cache critical path.

"Mark Bit Generator" was a topic covered in another TDB, Vol. 20. No. 9, of February 1978, by C. D. Holtz and K. J. Parchinski; while also in the data storage general field, the TDB included the item "Storage Byte Mark Decode With Boundary Recognition" by L. J. LaBalbo, W. L. Mostowy and A. J. Ruane Vol. 29 No. 12, May 1987, p. 5264 and the item by G. F. Grohoski and C. R. Moore entitled "Cache Organization to Maximize Fetch Bandwidth" in Vol. 32 No. 2 in July 1989, p. 62.

Other internal IBM developments which dealt with cross-boundary buffers, in addition to the Ngai publication, could be cited as a product called "RACETRACK 11" which was proposed and as illustrated by U.S. Ser. No. 07/291,510, filed Dec. 29, 1988, now abandoned, entitled "Hardware Implementation of Complex Data Transfer Instructions", p. 24. This machine prototype was provided for the LM (Load Multiple) instruction a register for storing the entire doubleword called a cross-boundary buffer (20–66 in that application) which effected a save of the data destined for a general purpose register (GPR). A mask could be set with the data saved in this cross-boundary buffer and later used for merging with fetched data. For the LM instruction, the cross-boundary buffer was controlled by a combination of "mini-instructions" and a baroque hardware control mechanism to handle various circumstances of GPR loading and storage boundary alignment. Alternatively, the cross-boundary buffer could be controlled by microcode for microcoded execution of instructions with multi-word storage operands. Looping controls were provided to execute microwords repeatedly until the storage operand was consumed; however, if the length of the storage operand in doublewords was not an integral of the number of storage read microwords in the loop, machine cycles were wasted issuing nullified read microwords. Also provided for the STM (Store Multiple) instruction was a register for storing the entire doubleword called a save register (pp. 28–29) which effected a save of the data destined for storage. A mask could be set with the data saved in this save register and later used for merging with data fetched from a GPR and destined for storage. Controls for STM were provided by means analogous to those for LM. The save register could not be controlled by storage write microwords and was therefore limited in use to the STM instruction. A corresponding European Patent Application has been published as of the date of filing of the present application, claiming U.S. Ser. No. 07/291,510, filed Dec. 29, 1988 as a priority document.

Generally in a data processing system where the processor can access a memory that is organized on multi-word boundaries, the storage address is sent to memory along with the kind of access (read or write, and length of access). A doubleword memory organization is used in many systems.

In S/370 and similar architectures, the disparity between the smallest unit of addressable storage (a byte) and the basic unit of computation (the 4-byte word) on which the storage organization is based gives rise to the cross-boundary storage access phenomenon. A cross-boundary storage access requires two n-words to be accessed to complete the storage reference, and therefore takes twice the amount of time to process as a non-cross-boundary or on-boundary access. These problems give rise to other possibilities, some examples of which are contained in the detailed description of our inventions, to provide a further background to the developments which we have achieved.

SUMMARY OF OUR INVENTIONS

In accordance with our inventions, we have provided for a data processing system a hardware accelerator for cross-boundary storage access. Generally, the system will have a processing unit for a storage array organized on multi-word boundaries where a word is some number of consecutive bytes representing the basic unit of computation for a processor.

The hardware which we have provided buffers residual read or write data in support of high speed, block-concurrent accessing of multi-word storage operands of the system. With our improvements, cross-boundary alignment and handling is detected and performed implicitly by hardware, and no special instructions need to be explicitly coded to handle cross-boundary storage accesses.

In using our preferred embodiment, the cache directory of the memory (a main memory and auxiliary memory or high speed cache) is not partitioned, and thus the handling of cross-boundary reads and writes is not limited to those occurring within a cache line or within a memory page. The hardware accelerator of our preferred embodiment has the ability to handle operands of arbitrary length through repeated use of the cross-boundary buffer. We support block-concurrent accesses for operands spanning multiple memory words with cross-boundary fetch and store logic. Block-concurrent memory accesses are defined such that all bytes within a contiguous field (halfword, word, or doubleword, for example) appear to have been accessed in a single reference by a first processor to the memory. Thus, no other processor may modify bytes within the block during the course of fetching by the first processor, nor may another processor observe intermediate results during the course of storing data by the first processor.

Multi-word storage operands are processed by the hardware we have provided, and the processing is an automatic function of the hardware. This automatic handling includes the automatic handling of data which may straddle a memory boundary. There is no need to explicitly code loop-controlling instructions by an instruction which decrements the storage operand length, or one that says to branch if length not equal to zero, or other such explicitly coded instructions. Furthermore, no machine cycles are wasted in processing the multi-word storage operand, irrespective of its length. In our preferred embodiment, we provide for saving fetches of multiple bytes and combining them with other bytes on subsequent accesses. We read multiple bytes from memory in a single block-concurrent access, and we are able to block concurrently store multiple bytes.

In order to illustrate the data processing system having these features we have provided a detailed description of our preferred embodiments together with examples of how different instructions are handled. In order to illustrate our inventions, our preferred detailed embodiment has an instruction processing unit and a storage array with doubleword organization, with one word being equal to four bytes. The hardware accelerator employs for transfer between storage and the instruction processing unit a storage-to-instruction-processing-unit interface. This interface includes an address bus which supplies the doubleword address from the instruction processing unit to storage (ABUS(0:28)); a control bus which indicates the kind of storage address, including whether the address is a read address or a write address, and the length of the access in bytes; and a byte address (ABUS(29:31)). This interface includes a data bus and data-in (DIREG) and data-out (DOREG) bus registers. The instruction processing unit has a control store array which contains microwords which direct operations of the instruction processing unit and the storage array, a general register array, an address register, a control register, and a read register. There is also an instruction microsequencer for fetching microwords from the control store array into a microinstruction register, an address generation adder with the output of the address generation adder including an address for addressing a doubleword in the storage array and the byte address for addressing the byte within the doubleword.

There can be a single or plural accelerator cross-boundary buffers. We prefer a single cross-boundary buffer. This enables us to share the use of a cross-boundary buffer for reads and for writes. When used for writing, the cross-boundary buffer (CBB) is coupled to a write rotating shifter. In addition, for the hardware accelerator we provide a write merger (WMERGE) and a write merge controller (WMCTL) which is coupled for an input to said control register (CREG). Instruction sequencing controls data transmitted on the data bus for merger with data contained in the cross-boundary buffer by a write merger before it is latched in a data bus out register, and for simultaneously also latching the data in the cross-boundary buffer, and for writing data from the data bus out register into the storage array in the next clock cycle of the instruction processor at a location addressed by said doubleword address.

When used for reading, the cross-boundary buffer of the accelerator is coupled to a read rotating shifter, and there is a read merger and a read merge controller which responds to control signals in the interface control register. Here the instruction sequencing on a read access generates a storage address together with a command which are latched in said address register and control register respectively. Then, in a subsequent cycle, the address register information is used to read a doubleword from the storage array. The doubleword operand is latched in the cross-boundary buffer and at the same time is passed through the read merger means where it may be merged with data already in the cross-boundary buffer, said merger means being under the control of said read merge controller.

These and other improvements are set forth in the following detailed description. For a better understanding of the inventions, together with advantages and features, reference may be had to the co-pending applications for other developments we have made in the field. However, specifically as to the improvements, advantages and features described herein, reference will be made in the description which follows to the below-described drawings.

BRIEF DESCRIPTION OF THE DRAWINGS.

FIG. 13 shows a timing diagram of the CBB operation for a Load Multiple instruction.

FIG. 14 shows another timing diagram for a Load Multiple instruction where the MSEQ detects that a cross-boundary read is occurring.

FIG. 15 shows another timing diagram for a Load Multiple instruction where data for the last read is supplied entirely from the CBB.

FIG. 16 shows a timing diagram for an on-boundary Load Multiple instruction.

FIG. 17 shows a timing diagram of the CBB operation for a Store Multiple instruction of 8 bytes or less where the MSEQ detects that a cross-boundary write is occurring.

FIG. 18 shows a timing diagram of the CBB operation for a Store Multiple instruction of more than 8 bytes where the MSEQ detects that a cross-boundary write is occurring.

FIG. 19 shows a timing diagram of the CBB operation for a Store Multiple instruction of more than 8 bytes where the MSEQ detects that a cross-boundary write is occurring and data for the last store comes entirely from the CBB.

FIG. 20 shows a timing diagram for an on-boundary Store Multiple instruction of more than 8 bytes.

Figure 1:
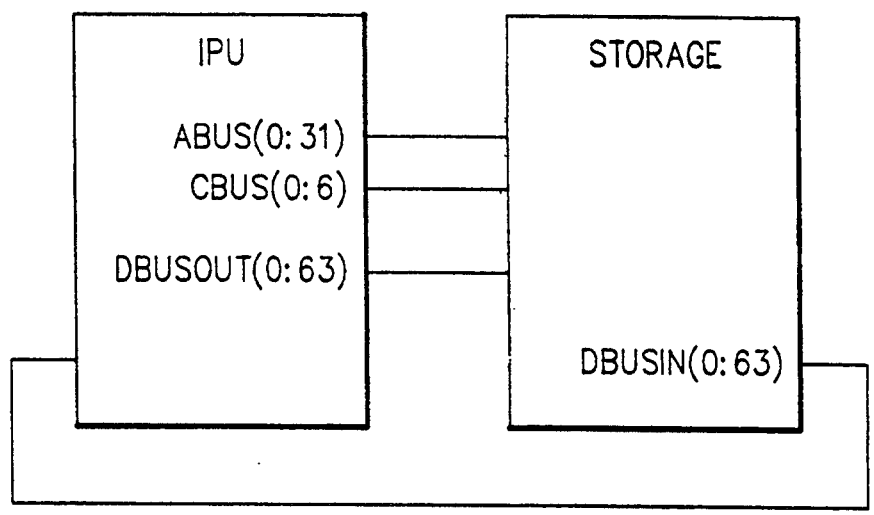
FIG. 1 shows our preferred IPU and storage interface.

Our detailed description follows as pads explaining our preferred embodiments of our inventions provided by way of example.

DETAILED DESCRIPTION OF THE INVENTIONS

Before considering our preferred embodiments it may be worthwhile to illustrate, by way of example, some possibilities which we have further considered and discarded. As we have said before, in S/370 and similar architectures, the disparity between the smallest unit of addressable storage (a byte) and the basic unit of computation (the 4-byte word) on which the storage organization is based gives rise to the cross-boundary storage access phenomenon. Furthermore, a cross-boundary storage access requires two n-words to be accessed to complete the storage reference, and as a consequence two times the period needed for processing as a non-cross-boundary or on-boundary access.

For example, consider the following S/370 Load instruction, with data arranged in storage as shown in Example 1A.

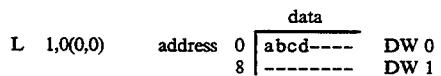

In this example, storage is organized on doubleword boundaries. Each lower-case letter represents a byte of data. The Load instruction will load general register (GR) 1 with a word of data from address 0. Thus, GR 1 may be loaded with a single access to DW 0.

Now consider the same operation, only this time the storage access begins at address 6, as illustrated by Example 1B.

EXAMPLE 1B

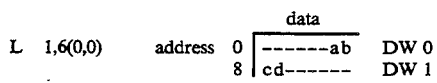

Two storage accesses are required to complete the operation: the first, a load of bytes ab from DW 0, and the second, a load of bytes cd from DW 1. The operation takes twice as long to complete as the previous example, even though the same number of bytes were loaded as by the instruction in the previous example.

The problem is multiplied when single instructions are permitted to access many words of storage, as, for example, the SS-format instructions in S/370, some of which may have storage operands up to 64 words in length. Assuming a doubleword storage organization requiring one machine cycle to access one doubleword, such an instruction would take 32 cycles to completely access a single storage operand if all accesses were on-boundary. If the accesses were all cross-boundary, however, 64 cycles would be required to complete the operation. A sufficiently-large frequency of cross-boundary accesses will markedly increase the cycles-per-instruction (CPI) of the processor, and therefore decrease the performance of the machine.

From the foregoing, there is considerable motivation to improve the cross-boundary storage access time. Quantitatively, for a doubleword storage organization requiring one machine cycle to access one doubleword, that time in cycles, $t_{cb}$, is $$t_{cb} = 2\left[\frac{L}{8}\right] \quad (1)$$

where L is the length of the storage access in bytes and the quantity in brackets is rounded to the next highest integer.

One obvious method of decreasing $t_{cb}$ would be to prohibit cross-boundary storage accesses. This solution is not within the realm of possibilities for well-established architectures such as S/370 which must maintain compatibility with earlier versions of the architecture.

Another method is to partition the storage array into odd and even n-words, as proposed by the IBM Technical Disclosure Bulletin, Vol. 25 No. 7A, December 1982, A. Y. Ngai and C. H. Ngai proposed "Boundary Crossing with a Cache Line", discussed supra. This solution introduces extra delay in the storage array address path (an address incrementer), which may be unacceptable when the storage array is a high-speed cache. Often, the path encompassing the cache address, cache access and data transfer back to the instruction processing unit (IPU) constitutes the longest or critical path in the machine and thus constrains the machine cycle time, the second factor in the machine performance equation. Also, each array requires its own output bus. This doubles the array output wiring complexity, which may cause both wiring and circuit delay problems.

The subject of our inventions which are illustrated by our preferred embodiments is a hardware accelerator for cross-boundary storage accesses that improves $t_{cb}$ to $$t_{cb} = 1 + \left[\frac{L}{8}\right] \quad (2)$$

which, for sufficiently large L., approaches half of Eqn. (1). (The quantity in brackets is rounded to the next highest integer.) This improvement is achieved without either requiring storage accesses to be on-boundary or inserting delay in the processor critical path.

DETAILED DESCRIPTION OF PREFERRED EMBODIMENTS

This invention will be described in the context of the S/370 instruction-set architecture. Further, assume the storage array to be organized on doubleword boundaries and that one doubleword may be accessed in one machine cycle. Also, assume the IPU to be a pipelined, microcoded processor, with pipeline stages defined as follows:

| Stage | Description |
| --- | --- |
| IF | microword fetch |
| AG | storage address generation |
| EX | storage array access |
| PA | storage data put away |

Microwords are issued and executed in an overlapped manner. Thus, in terms of pipeline stages, an execution sequence of consecutive microwords would appear as

| IF | AG | EX | PA |    |    |
| --- | --- | --- | --- | --- | --- |
|    | IF | AG | EX | PA |    |
|    |    | IF | AG | EX | PA | and so forth.

It is to be understood that these assumptions by no means limit the applicability of the invention to either S/370 architecture or the foregoing storage and IPU organizations. These are merely set forth for expository purposes.

The IPU and storage interface is shown in FIG. 1. ABUS(0:31) (the address bus) supplies the address from the IPU to storage for a storage access. CBUS(0:6) (the command bus) indicates the kind of storage access, i.e., read from storage or write to storage, the length of the access in bytes, and two other signals pertaining to the invention which will be discussed below. To avoid confusion with the S/370 Load and Store instructions, the terms "read" and "write" will be used for "load from storage" and "store to storage," respectively. DBUSOUT(0:63) (the out-going data bus from the IPU) supplies up to eight bytes of data for write accesses, and DBUSIN(0:63) (the in-coming data bus to the IPU) supplies up to eight bytes for read accesses.

Figure 2A:
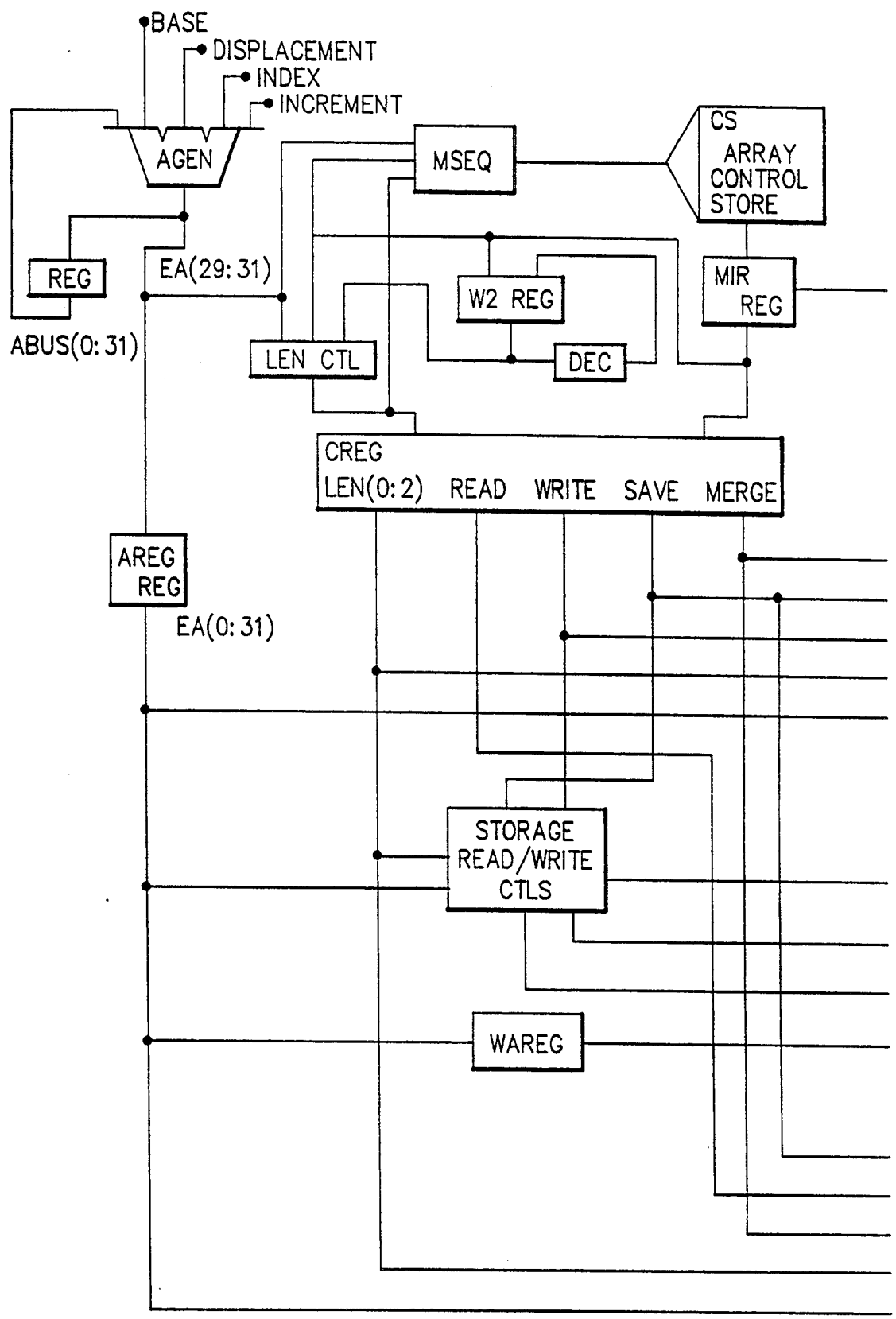
FIGS. 2A and 2B combined which show more detailed level of the elements in FIG. 1.
Figures 2, 2B:
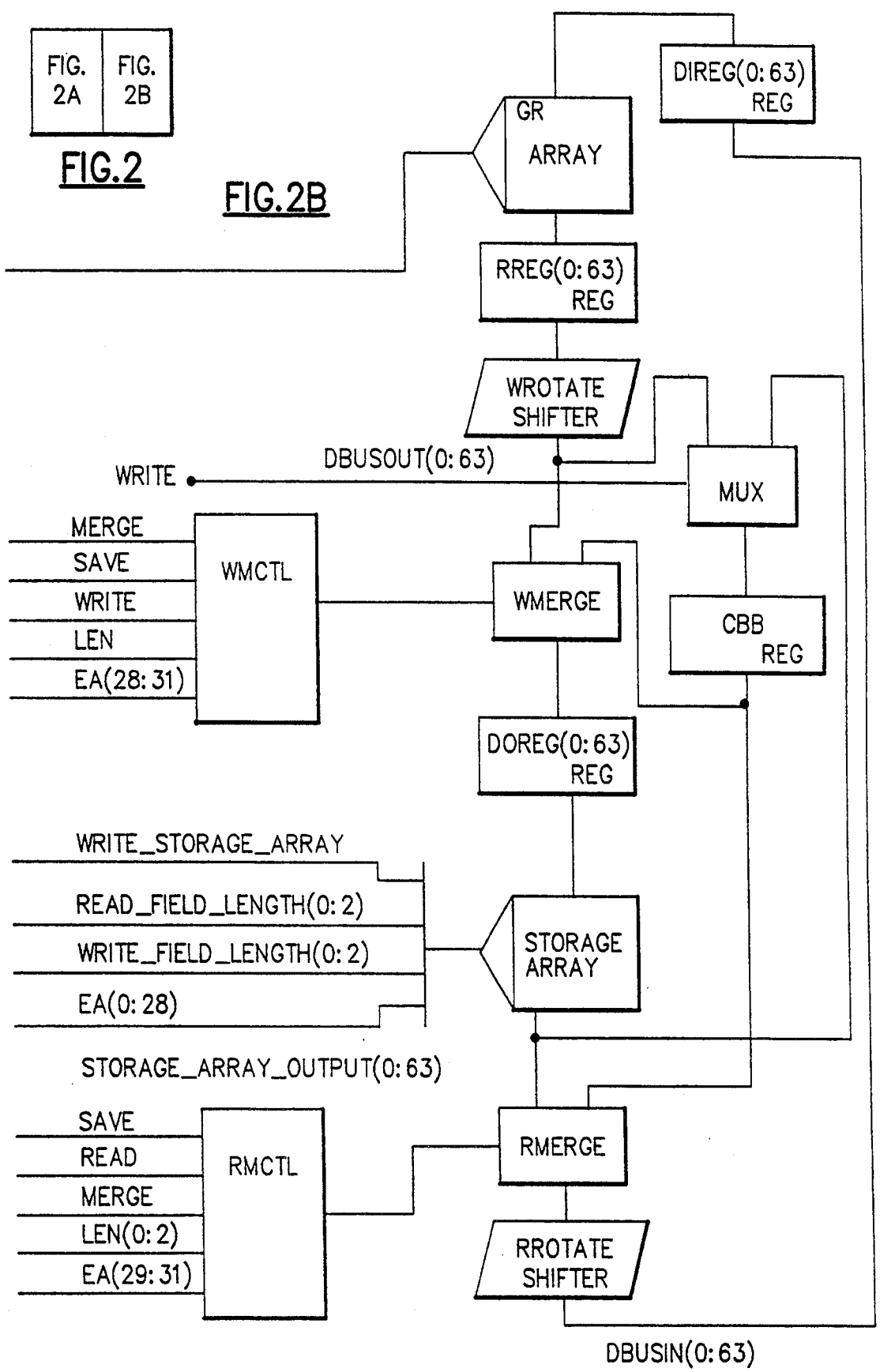

FIG. 2 takes the structures shown in FIG. 1 to the next level of detail, In the IPU, a control store array (CS) contains microwords which direct the operations of the IPU and storage. Microwords are fetched from the CS by the microsequencer (MSEQ) into the microinstruction register (MIR). Fields from the MIR control the activity of the CBUS, the address generation adder (AGEN), the write rotator (WROTATE) and the GR array. Another field, ENDOP, terminates execution of a microcode sequence and initiates decoding of the next instruction.

The AGEN adder performs the usual S/370 address generation, i.e., base GR +index GR+displacement, with the additional capability of incrementing the AGEN output by a specified amount for use in the following cycle. The AGEN output is the ABUS(0:31), which is further partitioned into a doubleword address ABUS(0:28) which is eventually used to address the storage array, and a byte address ABUS(29:31), whose use will be described further on.

The CBUS consists of the following signals:

| Signal | Function |
|---|---|
| LEN(0:2) | zero-origin length (a value of B'000' means one, a value of B'111' means eight) of the storage access in bytes |
| READ | if asserted, data is to be read from the storage array to the IPU |
| WRITE | if asserted, data is to be written from the IPU to the storage array |
| SAVE | (see below) |
| MERGE | (see below) |

The WRITE, SAVE, and MERGE signals are used to control the cross-boundary storage access acceleration mechanism and will be further described below.

Assume for simplicity that the GR array contains 16 registers numbered 0–15 and is organized into odd and even halves. An even-numbered GR may be written from DIREG(0:31) and read into RREG(0:31). An odd-numbered GR may be written from DIREG(32:63) and read into RREG(32:63).

The sequence of events that takes place for write and read accesses of our preferred embodiments illustrated by FIGS. 2 (et seq.) will now be described.

On a write access, the storage address is generated and transmitted to the storage hardware on the ABUS together with the CBUS command in the AG cycle. These are latched by the storage hardware in the AREG and CREG, respectively. Concurrently, up to a doubleword of data may be read from the GR array into the RREG. In the EX cycle, the output of RREG is rotated by WROTATE and transmitted to storage on the data bus DBUSOUT(0:63). WROTATE rotates the data so that the first byte of the data is positioned at the starting byte address of the write. For example, suppose GR1 contained the data abcd and it was desired to write one byte, the byte d, to storage at address 0. First, GR1 would be read into RREG(32:63) in the AG cycle. The contents of RREG(0:31) is unknown; let it be represented by xxxx. Since the byte address ABUS(29:31)=B'000', WROTATE will rotate the output of the RREG such that byte d is at address B'000'. Thus, the output of WROTATE will be dxxxxabc. This inherent capability in the rotator will be further exploited in the cross-boundary accelerator. Note that since the CBUS will indicate a write of length one, the bytes xxxxabc that accompany byte d on DBUSOUT are ignored.

The data transmitted on DBUSOUT may be merged with data in the cross-boundary buffer (CBB) by the write merger (WMERGE) before it is latched in the DBUSOUT register (DOREG). Simultaneously, the data is gated through MUX (since the WRITE signal is asserted) and is latched in the CBB. In the next cycle (PA), the data is written from DOREG into the storage array at the doubleword addressed by EA(0:28), the latched AREG(0:28). WMERGE and the CBB are under control of the write-merge controller (WMCTL) which takes inputs from the CREG. The CBB, WMERGE, and WMCTL hardware, with the rotation capabilities of WROTATE, together with control provided by a microcoded algorithm, constitute the cross-boundary acceleration mechanism when the storage access is a write.

On a read access, in the AG cycle the storage address is generated and transmitted to the storage hardware on the ABUS together with the CBUS command, which are latched in the AREG and CREG, respectively. In the EX cycle, the AREG(0:28) is used to read a doubleword from the storage array. This doubleword is gated through MUX (since the WRITE signal is not asserted) and latched in the CBB and at the same time is passed through the read merger (RMERGE), where it may be merged with data already in the CBB. RMERGE is under control of the read-merge controller (RMCTL), which responds to control signals in the CREG. The doubleword is then rotated by the read rotator (RROTATE) and transmitted on DBUSIN to the IPU where it is latched in DIREG. The data may then be written to the desired GR(s) during the PA cycle.

The function of RROTATE is entirely analogous to WROTATE. For example, suppose it was desired to read one byte from storage location 0 to the rightmost byte of GR0. Assume doubleword 0 in storage contained abcdefgh. Then, the rotator would produce the doubleword fghabcde based on the byte address EA(29:31). IPU hardware must ensure that only byte a is written to GR0, i.e., other bytes in the data transfer are ignored.

The CBB, RMERGE, and RMCTL hardware, with the rotation capabilities of RROTATE, together with control provided by a microcoded algorithm, constitute the cross-boundary acceleration mechanism when the storage access is a read.

The W2(0:7) register in the IPU is an 8-bit register that initially contains the total zero-origin length of the storage operand to be processed. The actual length sent on the CBUS, i.e., LEN(0:2), is produced by LENCTL and is a derivative of both W2 and the byte address ABUS(29:31) and is controllable by microcode. In particular, assume microcode may specify the following logical lengths (actual length refers to the zero-origin length transmitted on the CBUS):

| Logical Length | Actual length |
|---|---|
| DBDY | LEN= ABUS(29:31) |
| LW2 | If W2(0:4)=0 then LEN=W2(5:7) else LEN=7 |

The DBDY logical length provides a means to access storage from an arbitrary byte address up to the next doubleword boundary. For example, if ABUS(29:31)=B'001' and LEN=DBDY in the microword, the the actual length is B'001' or B'110', i.e., zero-origin 6, meaning a 7-byte access.

The LW2 logical length allows a storage operand to be accessed in 8-byte quantities up until the last access where the remaining bytes (from 1 to 8 bytes) are accessed.

The usages of these lengths will be illustrated in the examples set forth hereinafter; see Examples 2 and 3.

The logic-level detail of the WMCTL, WMERGE, and CBB for a write access will now be described.

Referring to FIG. 2, at the beginning of a storage write operation the write address is latched in the AREG, and the SAVE, MERGE, WRITE and LEN controls are latched in the CREG. The combinatorial logic contained in WMCTL uses these signals to control the transfer of data through the WMERGE unit to the input register of the storage array (DOREG).

Figure 3:
FIG. 3 illustrates our combinatorial logic related to the write operation which begins with SAVE active and MERGE inactive, and the register connections for low order AREG register address bits.
Figure 4:
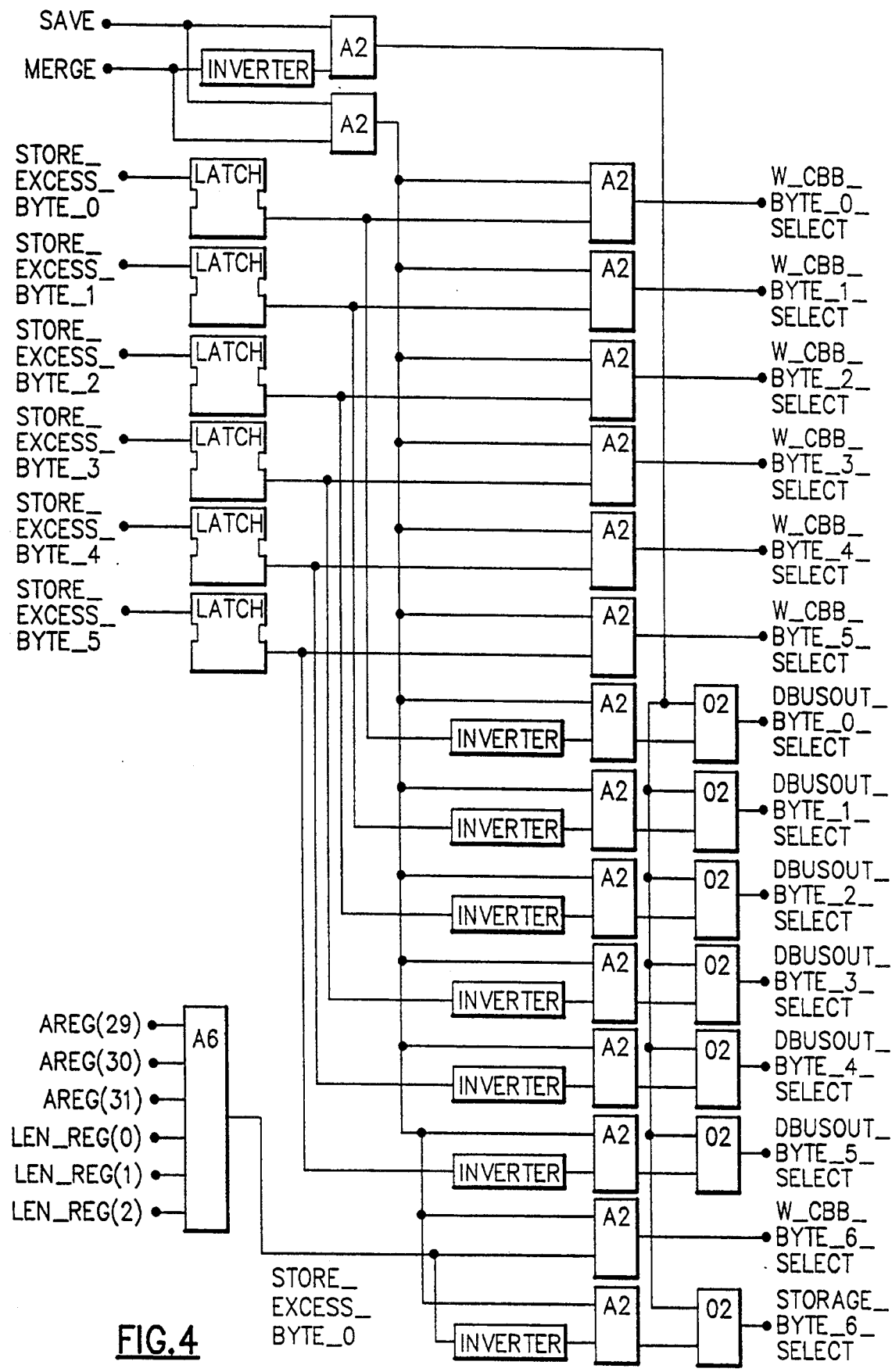
FIG. 4 illustrates our combinatorial logic related to the write operation which begins with SAVE active and MERGE inactive, and the FIGURE continues from left to right the logic illustrated in FIG. 3.
Figure 5:
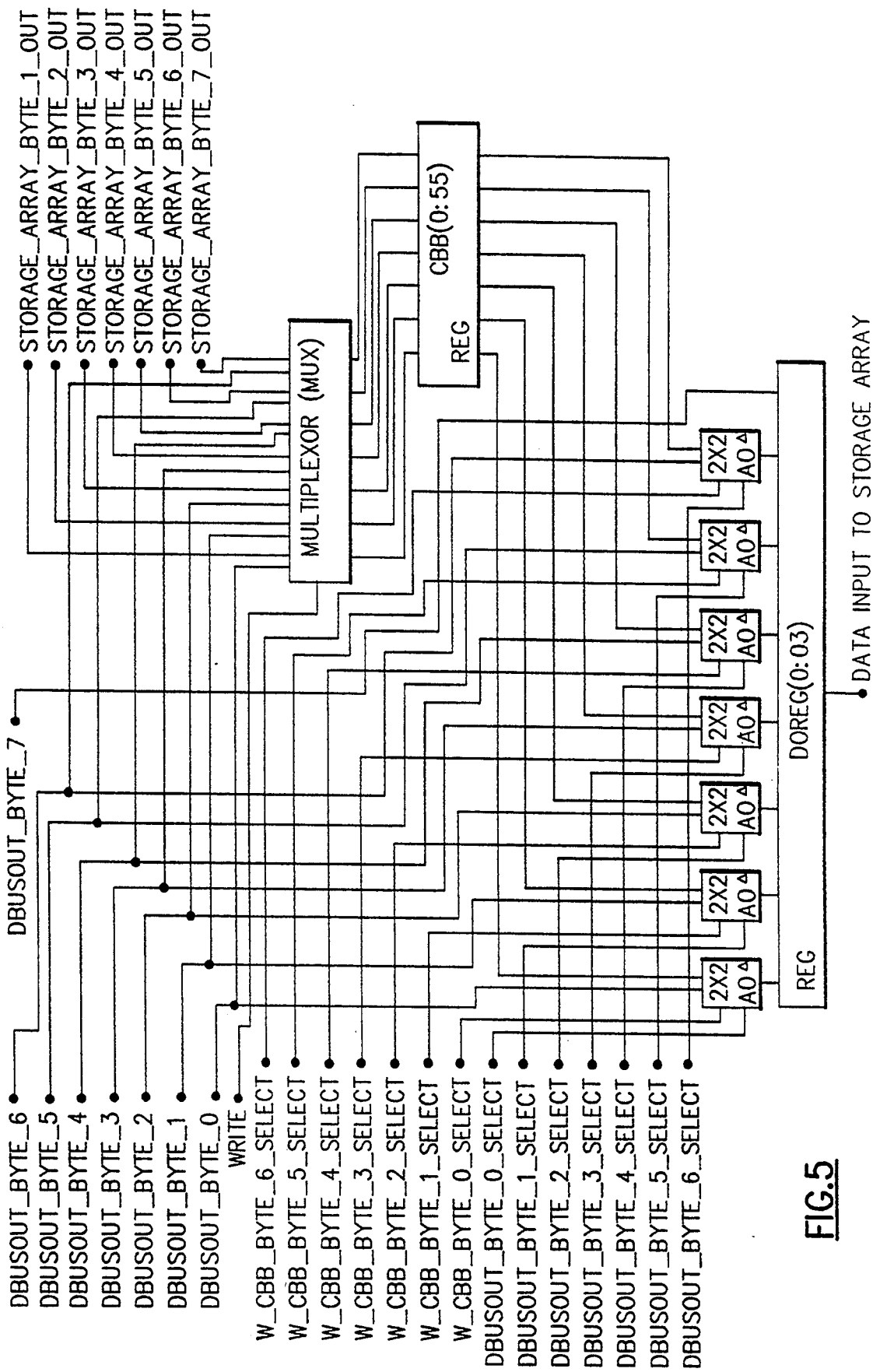
FIG. 5 illustrates the CBB and our combinatorial logic related to the write operation which begins with SAVE active and MERGE inactive, and the FIGURE continues the logic illustrated in FIG. 4.
Figure 6:
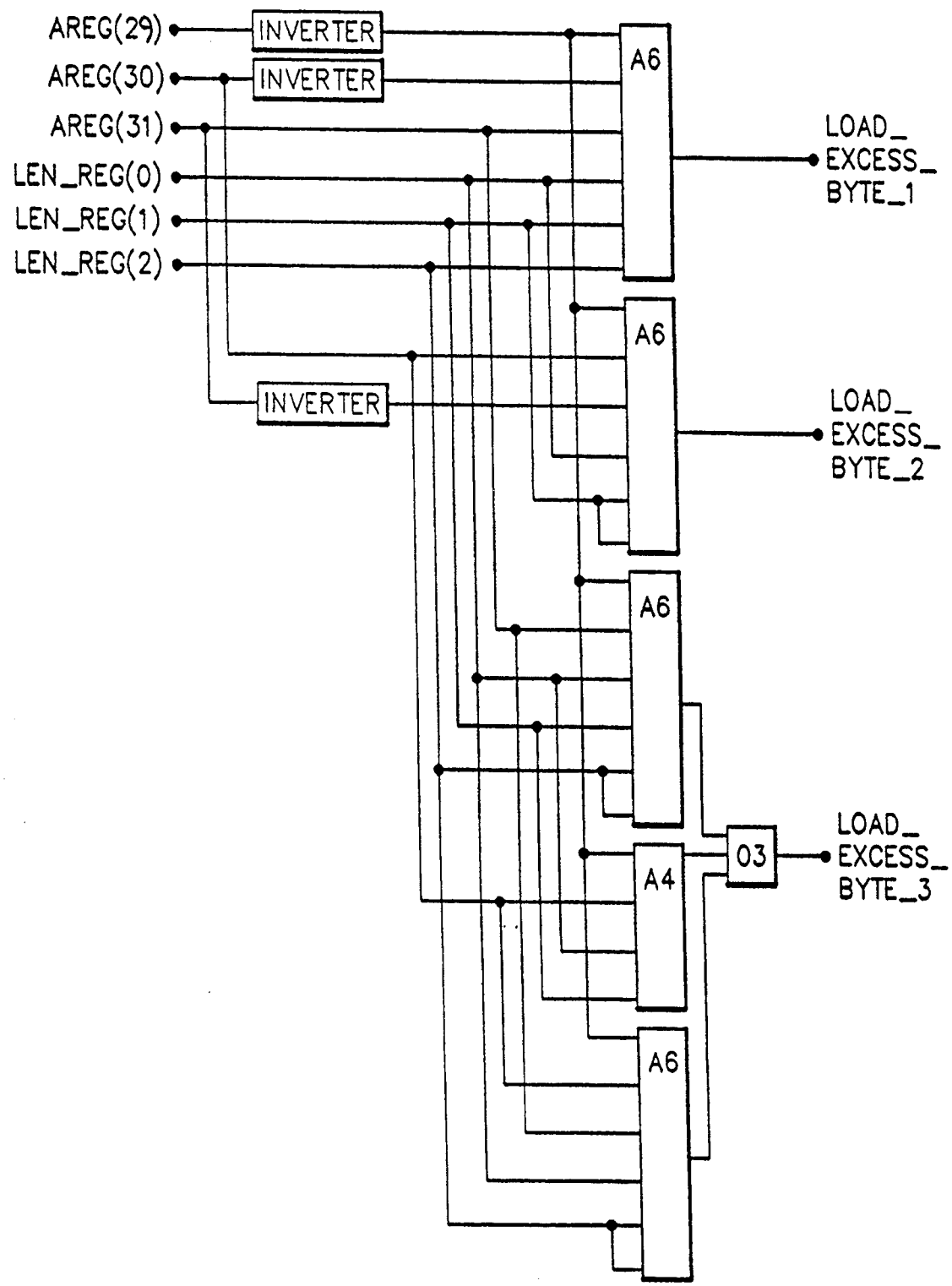
FIG. 6 illustrates our combinatorial logic related to a read operation which begins with SAVE active and MERGE inactive with the register connections for low order AREG register address bits.
Figure 7:
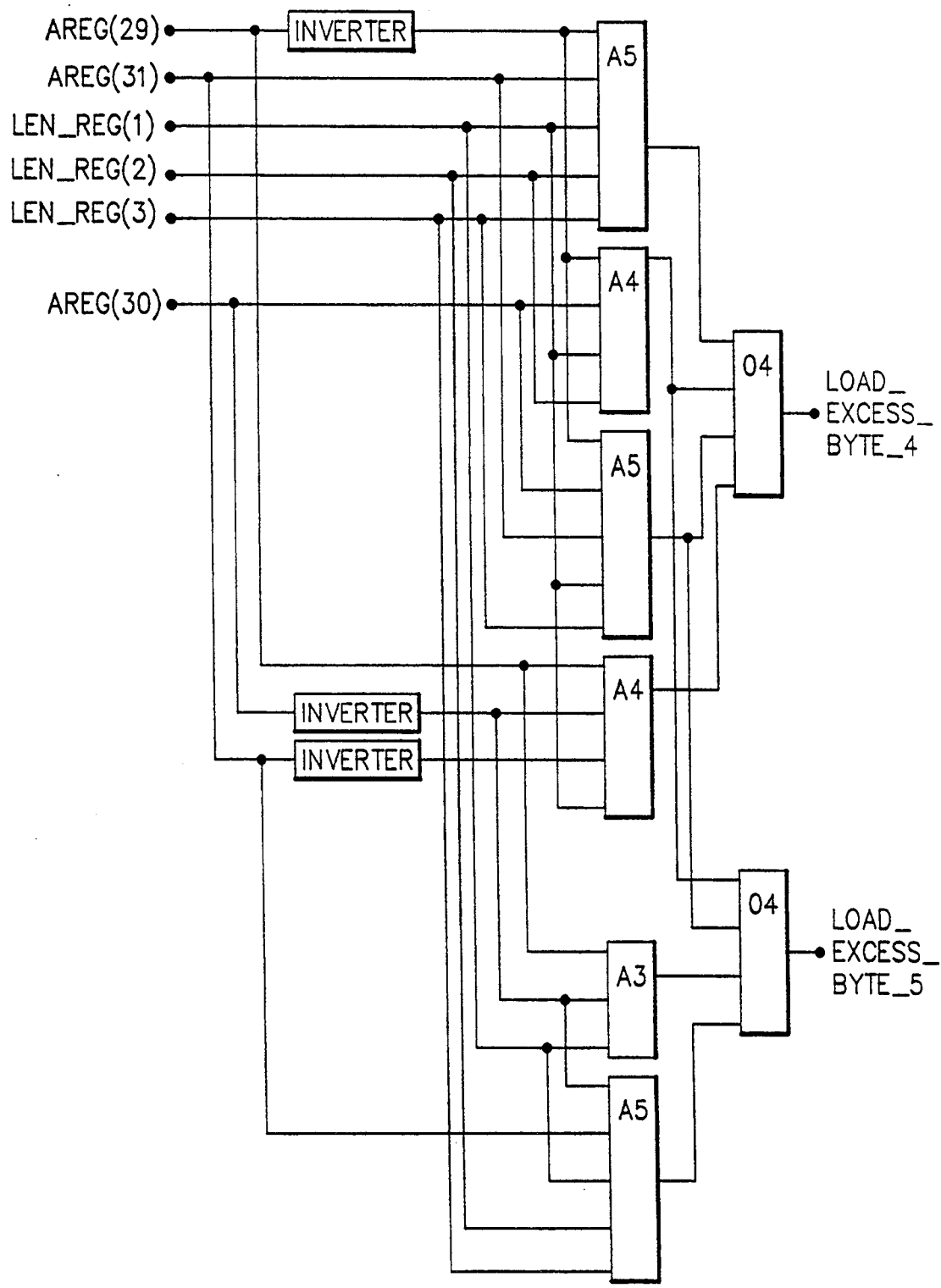
FIG. 7 illustrates our combinatorial logic related to a read operation which begins with SAVE active and MERGE inactive with the next stage following that illustrated by FIG. 6.
Figure 8:
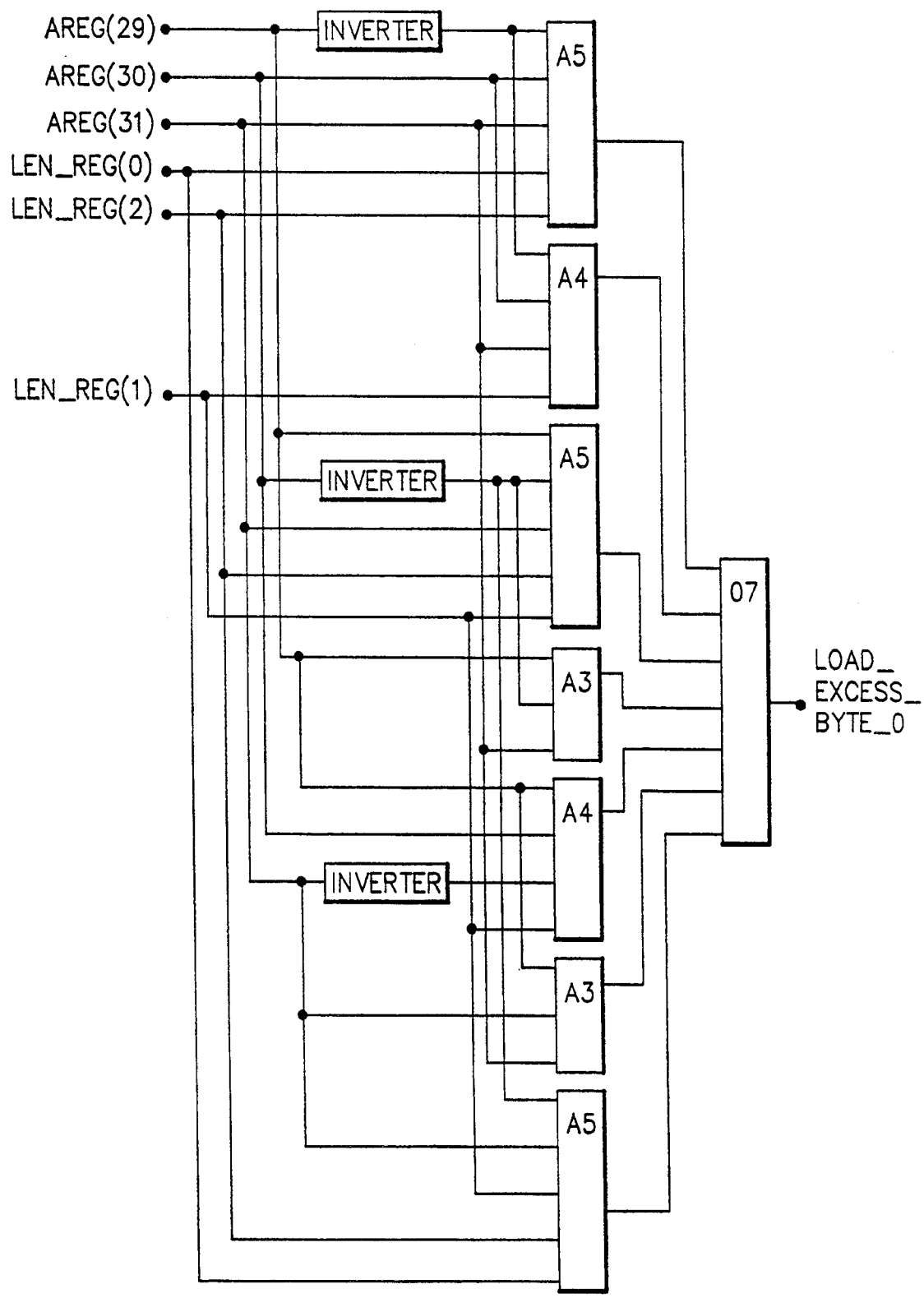
FIG. 8 illustrates our combinatorial logic related to a read operation which begins with SAVE active and MERGE inactive with the next stage following that illustrated by FIG. 7.
Figure 9:
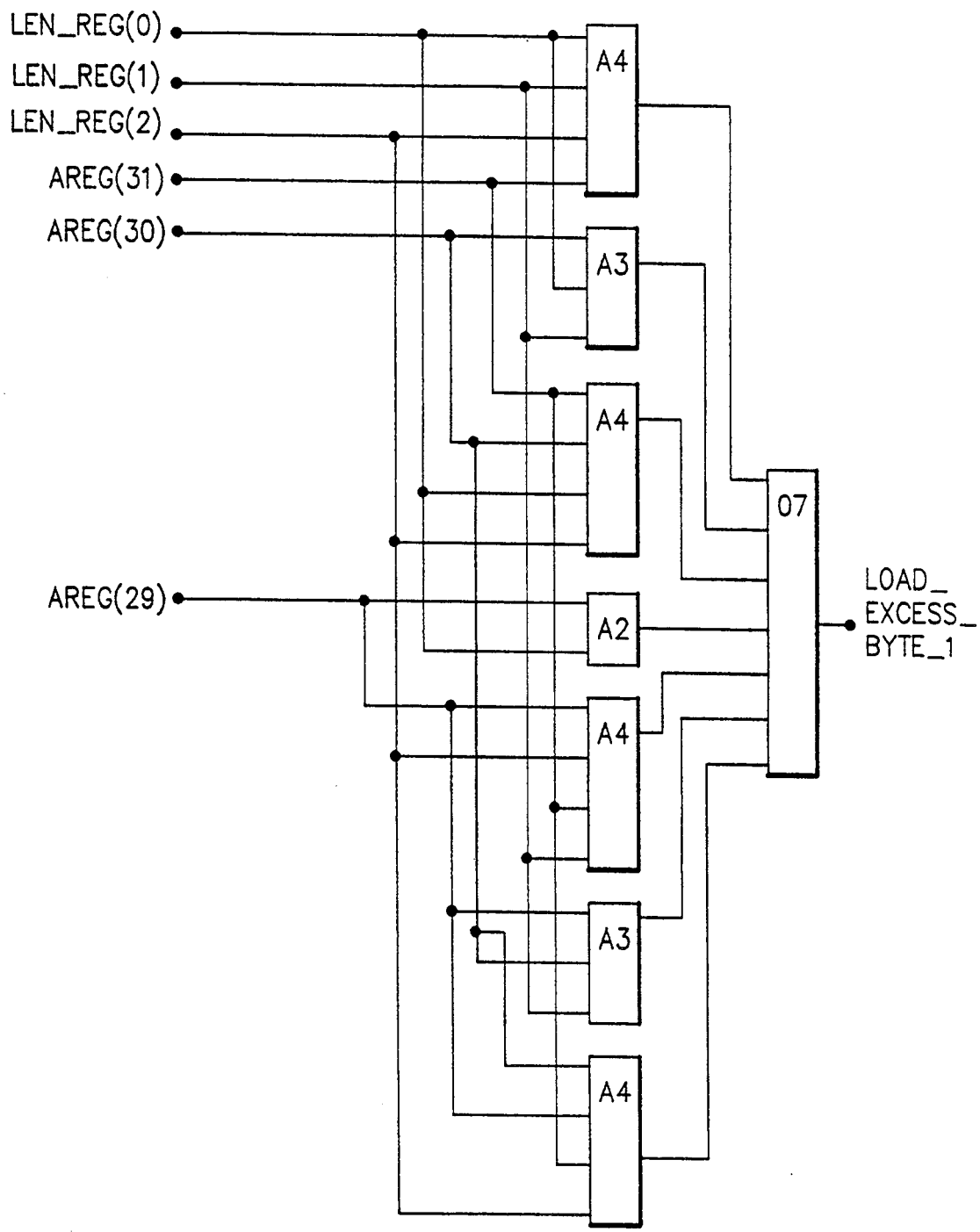
FIG. 9 illustrates our combinatorial logic related to a read operation which begins with SAVE active and MERGE inactive with the next stage following that illustrated by FIG. 8.
Figure 10:
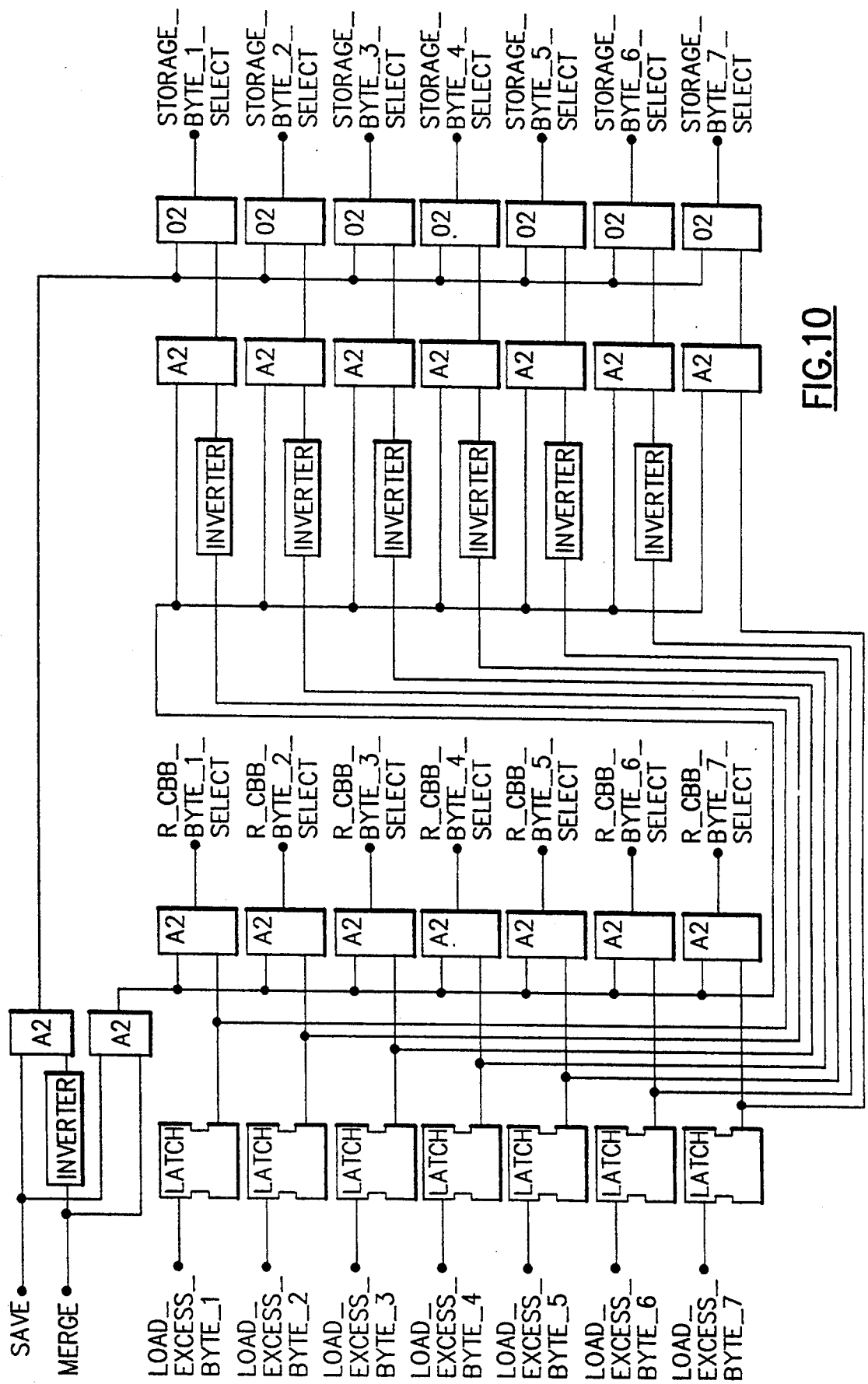
FIG. 10 illustrates our combinatorial logic related to a read operation which begins with SAVE active and MERGE inactive with the next stage following that illustrated by FIG. 9.
Figure 11:
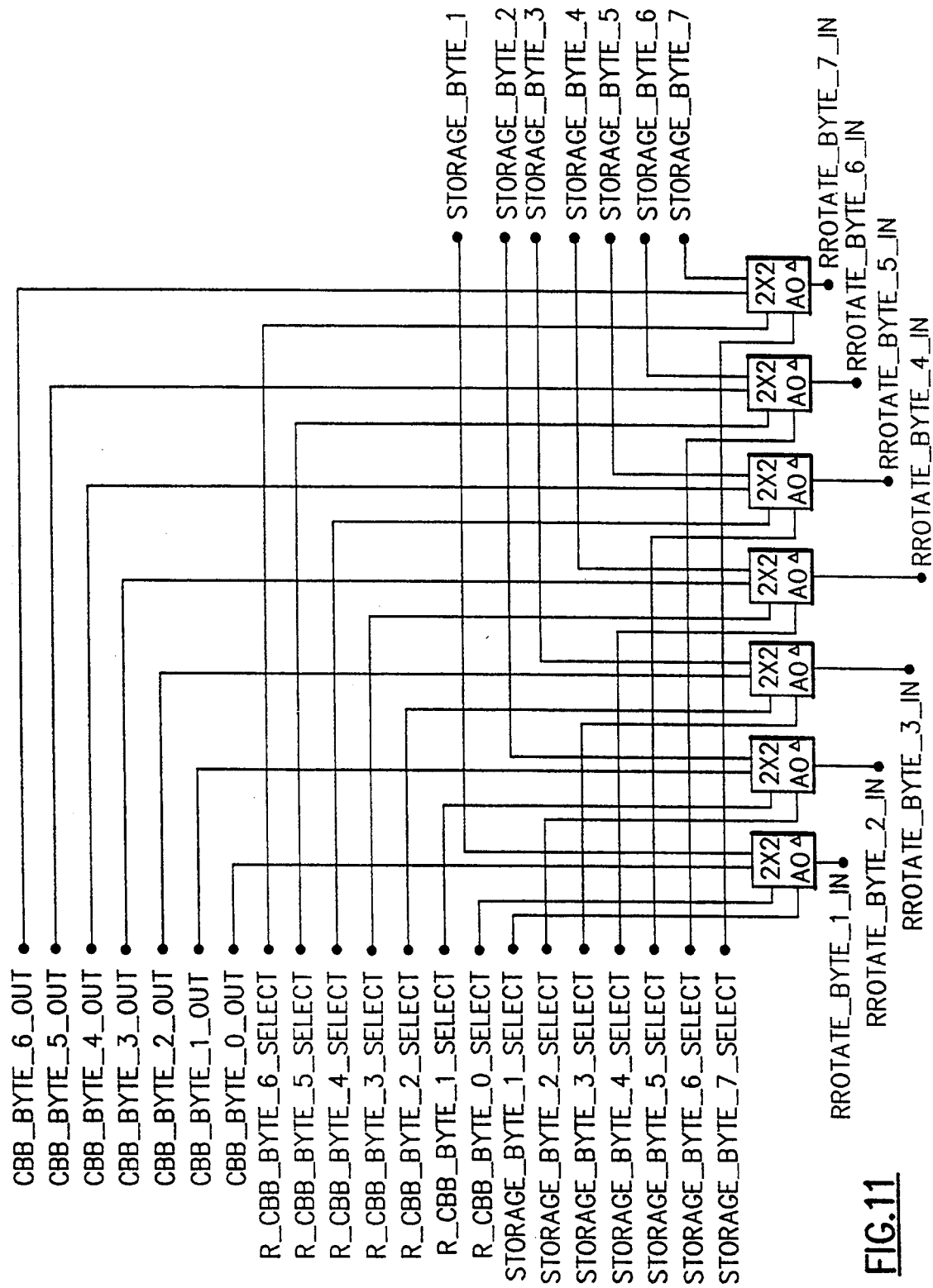
FIG. 11 illustrates our combinatorial logic related to a read operation which begins with SAVE active and MERGE inactive with the next stage following that illustrated by FIG. 10.

Referring to FIGS. 3, 4, and 5, a write operation begins with WRITE and SAVE active and MERGE inactive. The low order AREG address bits, AREG(29:31) are combined with the LEN bits, LEN(0:2) of the CREG to produce the signal STORE_EXCESS_BYTE_X ($0 \leq X \leq 6$). The aforementioned combination of SAVE and MERGE is decoded and is used to gate data from the DBUSOUT bus to the DOREG register, the input register of the storage array. Since WRITE is asseded, bytes 0 through 6 of the DBUSOUT bus are gated through MUX and stored in the CBB each cycle.

Note that for all cross-boundary write accesses only DBUSOUT(0:55) needs to be latched in CBB since at least one byte from the data currently on DBUSOUT(0:63) is always written to the storage array in the cycle immediately following the transfer. Thus, 8 latches may be saved by defining CBB to be 7 bytes (56 bits, numbered 0:55) wide.

During subsequent write cycles when WRITE and both SAVE and MERGE are active, selected bytes are transferred from the CBB to the DOREG register. The latched active STORE_EXCESS_BYTE_X, SAVE and MERGE signals are combined to produce W_CBB_BYTE_X_SELECT, a signal used to select bytes from the CBB to be stored to the DOREG register. The latched inactive STORE_EXCESS_BYTE_X, SAVE and MERGE signals are combined to produce DBUSOUT_BYTE_X_SELECT, a signal used to select bytes from DBUSOUT to be latched in DOREG.

Figure 12:
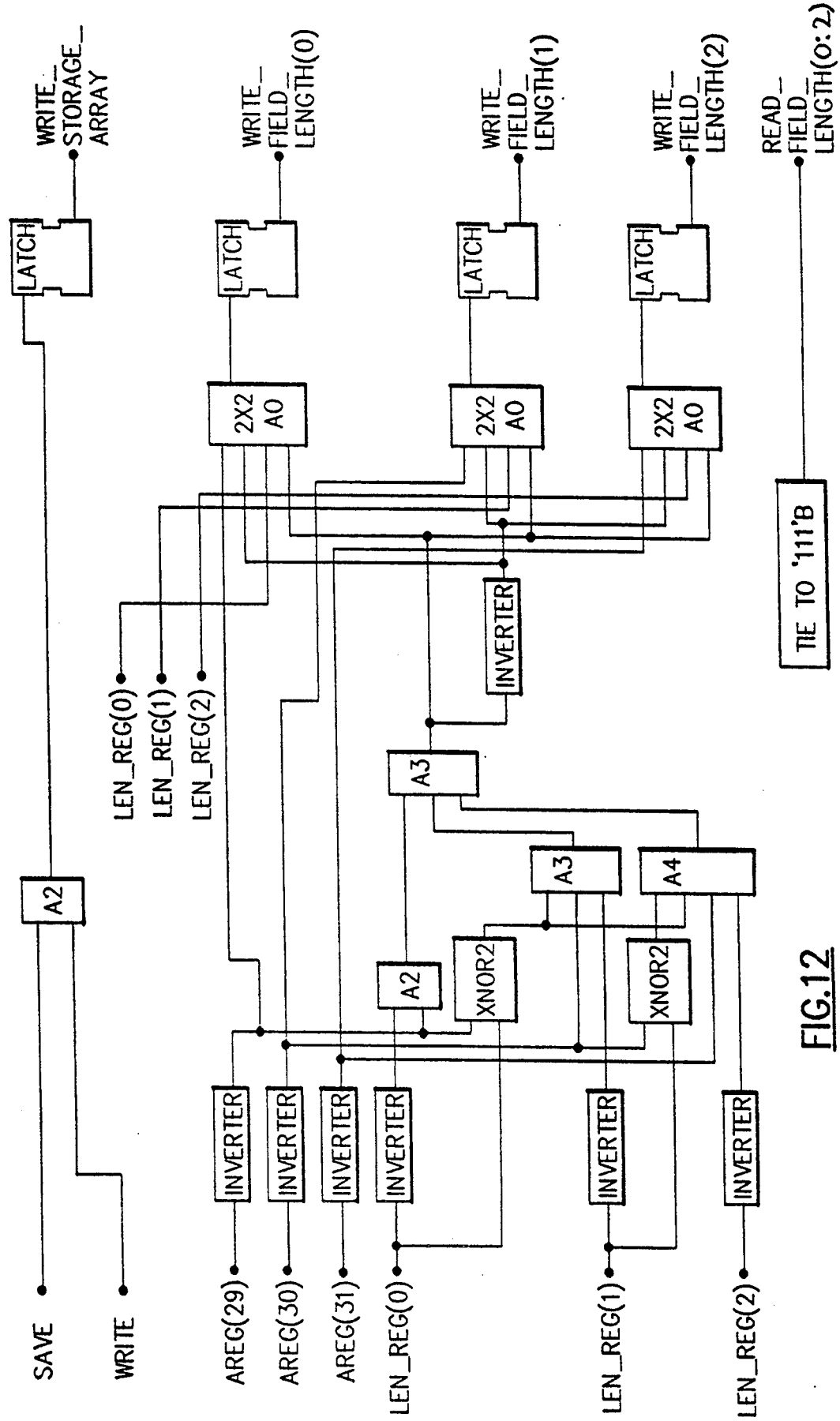
FIG. 12 shows the detailed logic for the writing of data to the storage array under control of the STORAGE READ/WRITE CTLS unit illustrated in FIG. 2.

The actual writing of the data to the storage array is under control of the STORAGE READ/WRITE CTLS unit, shown in FIG. 2. The detailed logic for this function is shown in FIG. 12. Here, the LEN bits from the CREG are inverted and latched to obtain the field length of the write and the starting write address is latched in the WAREG register from the AREG. During the following cycle these controls are used to write the data from the DOREG to the storage array.

The logic-level detail of the RMCTL, RMERGE, and CBB on a read access will now be described.

Referring to FIG. 2, at the beginning of a storage read operation, the read address is latched in the AREG and the SAVE, MERGE, READ and LEN controls are latched in the CREG. The combinatorial logic contained in RMCTL uses these signals to control the transfer of data through the RMERGE unit to the input of RROTATE.

Referring to FIGS. 5, 6, 7, 8, 9, 10 and 11, a read operation begins with SAVE and READ active and WRITE and MERGE inactive. The low order AREG address bits, AREG(29:31) are combined with the LEN bits, LEN(0:2) of the CREG to produce the signal LOAD_EXCESS_BYTE_X ($1 \leq X \leq 7$). The aforementioned combination of SAVE and MERGE is decoded and is used to gate data from the output of the storage array through RMERGE to the input of RROTATE. Since the WRITE signal is not asserted, bytes 1 through 7 of the storage array output are gated through MUX and are stored in the CBB each cycle. The storage array which is supplied a starting doubleword address from the AREG reads 8 bytes of data each cycle.

Note that for all cross-boundary read accesses only 7 bytes of the data read from the storage array, STORAGE_ARRAY_OUTPUT(8:63), are latched in the CBB since at least one byte of data is read from the storage array and transferred to the IPU when the requested number of bytes exceeds the number of valid bytes stored in CBB. Therefore, the CBB need only be 7 bytes (56 bits, numbered 8:63) wide for a read access, thereby allowing a single 7-byte CBB to be shared for read and write accesses. During subsequent read cycles when both SAVE and MERGE are active and WRITE is inactive (READ is active), selected bytes are transferred from the CBB to the RROTATE shifter through RMERGE. The latched active LOAD_EXCESS_BYTE_X, SAVE and MERGE signals are combined to produce R_CBB_BYTE_X_SELECT, a signal used to select bytes from the CBB to transfer to the RROTATE shifter. The latched inactive LOAD_EXCESS_BYTE_X, SAVE and MERGE signals are combined to produce STORAGE_BYTE_X_SELECT, a signal used to steer bytes from the output of the storage array to RROTATE. Data passed through RROTATE is aligned according to AREG(29:31) as described previously, and is then transmitted to DIREG on DBUSIN.

EXAMPLES OF OPERATION

Examples illustrating the operation of the IPU and storage systems described will now be considered. The examples employ particular/370 instructions to illustrate the functions previously described and are in no way intended to be limiting.

In the examples, an Instruction Decode and Setup (ID) cycle has been added to each instruction to facilitate making necessary preparations for execution of the instruction, e.g, initializing the W2 register, selecting and fetching the proper microcode algorithm, etc. IF cycles are not shown. Also note that the CBB is defined for bits 0:63. Previously, it was shown that the CBB need only be 7 bytes wide, which is indeed the case. However, defining the eighth byte allows the explanation to be given in terms of doublewords, which is more readily understood.

CROSS-BOUNDARY READS

Consider a Load Multiple instruction with data organized in storage as shown in the following Example 2A.

EXAMPLE 2A

```
                                        data
   LM   0,1,4(0)    address   0 | ----abcd
                              8 | efgh----
```

Assume that separate microcode algorithms are defined for LM with length$\leq$8 bytes and LM>8 bytes. Which algorithm to choose is determined in the ID cycle by logic which examines the LM instruction text to determine the length of the LM storage operand. The former case requires a single microword; the latter case requires two, with iterations on the second word until all GRs are loaded. In both cases, W2 is initialized to the total number of bytes to be loaded (zero origin).

The timing diagram in FIG. 13 illustrates the CBB operation for the instruction. Microword 1 for LM specifies ENDOP=1, READ=1, SAVE=1, MERGE=0 and LEN=LW2. The value shown for LEN in the figure is that to which the logical length LW2 resolves and is the value transmitted on the CBUS. MSEQ detects that this coding together with ABUS(29:31)≠0 implies a cross-boundary read. As a result, MSEQ automatically repeats microword 1, increments ABUS by 8 and forces MERGE to 1. This is the first of two cases where hardware overrides the merge control specified in the microword: a read with SAVE=1 is specified and the length of the storage operand is such that a cross-boundary access is required.

The doubleword at address 0 is fetched from the storage array in cycle 3 and is saved in the CBB at the end of the cycle. The excess bytes, i.e., the bytes not returned to the IPU, namely bytes abcd, are so marked in the CBB. The second read request, issued in cycle 3, causes storage to access the doubleword at 8. Since MERGE was asserted for this request, the excess bytes in the CBB are merged with required bytes from the second doubleword and the rotated result is forwarded on the DBUSIN to the IPU in cycle 4 and latched in DIREG from where GR0 and GR1 may then be written in cycle 5. ENDOP causes termination of the microcode sequence.

Consider a second example of LM, Example 2B, as follows:

EXAMPLE 2B

```
                              data
LM  0,3,1(0)   address  0 | - a b c d e f g
                        8 | h i j k l m n o
                       10 | p - - - - - - -
```

The timing is illustrated in FIG. 14. Microword 1 for LM is coded ENDOP=0, READ=1, SAVE=1, MERGE=0 and LEN=LW2. A mode control bit in MSEQ is also set by microword 1 to disable subsequent ENDOP signals until the operand is fully accessed. Once again, MSEQ detects that a cross-boundary read is occurring and thus automatically reissues microword 1, incrementing ABUS by 8 and forcing MERGE to 1. In response to the first read, RMCTL saves the doubleword at 0 in the CBB and flags the excess bytes. On the read of the doubleword at 8, the excess bytes from the CBB are merged with sufficient bytes from the doubleword at 8 to satisfy the length requested. The result is rotated and forwarded on DBUSIN to the IPU. The doubleword at 8 is saved in the CBB, with the excess bytes flagged.

A second microword is required to read the remaining bytes. Microword 2 for LM is coded ENDOP=1, READ=1, SAVE=1, MERGE=1 and LEN=LW2. Since MERGE is explicitly asserted by the microword, MSEQ does not reissue the microword; the doubleword currently fetched from storage is instead merged with the excess bytes in the CBB. This is illustrated in cycle 5, where byte p from doubleword X'10' is merged with excess bytes ijklmno from the CBB.

The storage operand length could be such that the last read requires no storage array access, i.e., all bytes required are already in the CBB. Consider a LM 0,2,1(0), operating on the same data as before. The timing is illustrated in FIG. 15. The sequencing is similar to that for LM 0,3,1(0), except note that in cycle 4, a 4-byte read is requested. Although the ABUS points to the doubleword at X'10', RMCTL recognizes that the read length requested is less than or equal to the number of excess bytes in the CBB. Therefore, no storage array access is required; the required bytes are simply unloaded from the CBB, rotated and delivered to IPU on DBUSIN.

Notice in cycle 5 that the data for GR2 is on DBUSIN(0:31), and unwanted data is on DBUSIN(32:63). If it is assumed that simple incrementers are used to address the GR pairs to be loaded from DIREG each cycle, then GR3 would be scheduled to be loaded from DIREG(32:63) in cycle 6. This can not be permitted in this case since the LM instruction only loads GRs 0, 1, and 2.

Hardware is provided to prevent this, and consists of simply determining if the LM instruction loads an odd number of GRs, and, if so, blocking the load of the odd GR during the PA cycle of the last LM (this is indicated when W2 is decremented through zero).

Once the operand is fully accessed, as determined by the contents of W2, ENDOP is enabled, causing termination of the microcode sequence. The mode control bit set in microword 1 to disable ENDOP is reset automatically.

Finally, consider an on-boundary LM as shown by Example 2C.

EXAMPLE 2C

```
                              data
LM  0,3,0(0)   address  0 | a b c d e f g h
                        8 | 1 j k l m n o p
```

The timing is illustrated in FIG. 16. Note that although the CBB is loaded in both accesses, each time the number of bytes requested (LEN) could be completely fulfilled with the storage array access alone, i.e., no bytes are flagged as excess in the CBB. When this condition is true, RMCTL ignores the merge imperative.

The described mechanism is general in that it can be utilized in all instructions which read from storage and may cross a doubleword boundary on the access. In particular,/370 SS-format instructions may utilize the mechanism to read operand 2 in a manner which is both high performance (avoids all but one cross-boundary stall) and satisfies architectural block concurrency requirements. Accesses to operand 1 (which is first read from then written to) are coded without SAVE or MERGE specified so as to avoid corrupting the operand 2 data in the CBB with operand 1 data. Typically, operand 1 accesses can be doubleword aligned anyway, after an initial access using LEN=DBDY.

CROSS-BOUNDARY WRITES

Consider a Store Multiple instruction with data to be written in storage as shown in Example 3A.

EXAMPLE 3A

```
                              data
STM  0,0,6(0)  address  0 | - - - - - - a b
                        8 | c d - - - - - -
```

Assume that separate microcode algorithms are defined for STM with length ≦8 bytes and STM>8 bytes. Which algorithm to choose is determined in the ID cycle by logic which examines the STM instruction text to determine the length of the STM storage operand. The former case requires a single microword; the latter case requires two, with iterations on the second word until all GRs are stored. In both cases, W2 is initialized to the total number of bytes to be stored (zero origin).

The timing diagram in FIG. 17 illustrates the CBB operation for the instruction. Microword 1 for this STM is coded ENDOP=1, WRITE=1, SAVE=1, MERGE=0 and LEN=LW2. The length resolves to 3(4 bytes) and ABUS(28:31)=6, implying a cross-boundary write. Detecting this, MSEQ automatically repeats word 1, incrementing ABUS by 8 and forcing MERGE to 1. This is the second of two cases where hardware overrides the merge control specified in the microword: a write with SAVE is specified and the length of the storage operand is such that a cross-boundary access is required.

The contents of GR0 are rotated and transferred to L1 on the DBUSOUT in cycle 3. Bytes ab are stored in the DOREG from where they may be written to the storage array. Simultaneously, the entire doubleword is stored in the CBB with excess bytes cd flagged. Since microword 1 is repeated in cycle 3, the storage command is reissued, ABUS is incremented by 8, and the rotated contents of GR0 are on the DBUSOUT again in cycle 4. WMCTL may then select the remaining bytes to be stored from either DBUSOUT or CBB and form the next storage array entry.

This mechanism may be applied to all storage write accesses of length ≦ 8 bytes.

A STM of more than 8 bytes uses the CBB differently. Consider the following STM instruction with data to be stored as shown in Example 3B.

EXAMPLE 3B

```
                              data
STM  0,3,4(0)    address  0 | - - - - a b c d
                          8 | e f g h i j k l
                         10 | mn o p - - - -
```

The timing for the instruction is illustrated in FIG. 18. Microword 1 is coded ENDOP=0, WRITE=1, SAVE=1, MERGE=0 and LEN=DBDY and is therefore an on-boundary access. Microword 2 is coded ENDOP=1, WRITE=1, SAVE=1, MERGE=1, and LEN=LW2. Word 2 loops on itself until all necessary GRs are stored. For both words, ABUS is incremented by 8.

In cycle 2, the 4-byte write up to the doubleword boundary is issued. The rotated GR0 and GR1 are transferred to storage on DBUSOUT in cycle 3. The entire transfer is saved in the CBB, with bytes efgh marked as excess. Bytes abcd form the first storage array entry. Also in cycle 3, microword 2 has issued an 8-byte write with SAVE=1 and MERGE=1, and the rotated GRs 2 and 3 are then transferred to storage on DBUSOUT. Again, WMCTL places the doubleword in the CBB, marking bytes mnop as excess. Since MERGE=1, WMCTL forms the next storage array entry by merging excess bytes from the previous transfer with bytes ijkl from the current DBUSOUT transfer.

Since W2 indicates that 4 bytes remain to be written, word 2 is issued a second time in cycle 4. When storage receives the write command, it will detect that the length of the write is less than or equal to the number of excess bytes flagged in the CBB and will therefore form the final storage array entry entirely from the CBB excess bytes. Thus, the contents of DBUSOUT in cycle 5 is disregarded. ENDOP is handled in the same manner as in Example 2B.

Consider another STM instruction with data to be stored as shown in Example 3C.

EXAMPLE 3C

```
                              data
STM  0,4,4(0)    address  0 | - - - - a b c d
                          8 | e f g h i j k l
                         10 | mn o p q r s t
```

The timing for the instruction is illustrated in FIG. 19. The main difference between this and the previous STM occurs in cycles 4 and 5. In cycle 4, an 8-byte write with SAVE=1 and MERGE=1 with GR4 rotated and transferred on DBUSOUT in cycle 5. WMCTL will determine that since there are 4 excess bytes in the CBB, but a write of 8 bytes has been requested, it must look to DBUSOUT for the remaining 4 bytes, i.e., qrst. These are merged with the excess bytes (mnop) from the CBB,and a final storage array entry is formed.

Finally, consider an on-boundary STM as shown in Example 3D.

EXAMPLE 3D

```
                              data
STM  0,2,0(0)    address  0 | a b c d e f g h
                          8 | i j k l - - - -
```

The timing for the instruction is illustrated in FIG. 20. In cycle 2, an 8-byte write command with SAVE=1 and MERGE=0 is issued, and in cycle 3, the doubleword is transferred to storage. Since the length of the write completely fills a doubleword, no bytes are flagged as excess when the data is written into the CBB in cycle 4. Concurrently, the data is loaded into DOREG. forming the storage array entry. The final 4 bytes of data are transferred in cycle 4. Since no excess bytes are flagged in the CBB, no merge is performed, even though the command in cycle 3 indicates MERGE=1. A final storage array entry is formed from the last data transfer.

The mechanism described may be applied to a variety of/370 instructions requiring multiple contiguous writes, e.g., STM, Store Access Multiple (STAM), Branch and Stack (BAKR), etc.

ALTERNATIVES TO PREFERRED EMBODIMENTS

The partitioning of the GR array into even and odd halves was done for expository purposes only. The invention may be readily applied to an implementation using a single, non-partitioned storage array with its general registers, as that implementation, with additional circuitry, can be created by those skilled in the art without difficulty (the circuity not being deemed germane to our invention). Thus, an arbitrary GR organization may be supported.

While we have described our preferred embodiments of our inventions it will be understood that those skilled in the art, both now and in the future, upon the understanding of these discussions will make various improvements and enhancements thereto which fall within the scope of the claims which follow. These claims should be construed to maintain the proper protection for the inventions first disclosed.

What is claimed is:

1. A data processing system having an instruction processing unit (IPU) and a storage array organized on word boundaries or multi-word boundaries where a word is some number of consecutive bytes representing the basic unit of computation for said instruction processing unit, comprising:

said instruction processing unit and said storage array; and hardware accelerator means for cross-boundary storage access to said storage array including a cross boundary buffer means for providing residual read and write data to said instruction processing unit in support of high speed, block concurrent accessing of multi-word operands of said system and for operating on multiple words, with residues from a second and subsequent accesses enabling continuation of the accessing process by said hardware accelerator means beyond two memory words to span more than a word boundary and to allow high speed block-concurrent accesses to and from said storage array for load multiple and store multiple instructions.

2. A data processing system according to claim 1 wherein said hardware accelerator means includes means for providing off boundary alignment handling which is detected and performed implicitly by said hardware accelerator means.

3. A data processing system according to claim 2 wherein said off boundary storage alignment handling is an automatic function of said hardware accelerator means without the use of explicitly coded instructions to perform the automatic function.

4. A data processing system according to claim 1 wherein said hardware accelerator means includes means for automatically processing multiword storage operands during block concurrent accesses to said storage array.

5. A data processing system according to claim 1 wherein said hardware accelerator means includes means for automatically processing data which may straddle a memory boundary in said accesses to said storage array.

6. A data processing system according to claim 1 wherein said hardware accelerator means includes means for fetching multiple bytes of a word and for combining them with other bytes on subsequent accesses to said storage array.

7. A data processing system according to claim 1 wherein said hardware accelerator means includes means for reading multiple bytes from memory in a single block-concurrent access to said storage array and means for storing block-concurrent multiple bytes of a word.

8. A data processing system according to claim 7 wherein a storage cache directory is provided for the memory and wherein handling of cross-boundary reads and writes is not limited to those within a cache line or a memory page.

9. A data processing system according to claim 8 wherein said hardware accelerator means includes means for repeating the use of said cross boundary buffer means for handling operands of an arbitrary length, 10. A data processing system according to claim 1 wherein said storage array is provided with a general register, an address register and a control register for respectively receiving signals over an address bus and a control bus from said instruction processing unit, and wherein said hardware accelerator means includes as pad of said cross boundary buffer means a cross boundary buffer, and further includes a merge unit, a controller for said merge unit, microcode for said controller for said merge unit for providing control for said hardware accelerator means during a storage access, and a rotating means for rotating a word unit or multi-word unit being transferred to or from said general register during a storage access.

11. A data processing system according to claim 1 wherein said storage array is provided with a general register, an address register and a control register for respectively receiving signals over an address bus and a control bus from said instruction processing unit, and wherein said hardware accelerator means includes as pad of said cross boundary buffer means a cross boundary buffer, and further includes both a read and a write merge unit, a controller for each of said merge units, microcode for said controller for said merge unit for providing control for said hardware accelerator means during a storage access, and a rotating means for rotating a word unit being transferred to or from said general register during a storage access.

12. A data processing system according to claim 1 wherein said storage array is provided with a general register, an address register and a control register for respectively receiving signals over an address bus and a control bus from said instruction processing unit, and wherein said hardware accelerator means includes as pad of said cross boundary buffer means a cross boundary buffer, and further includes both a read and a write merge unit, a controller for each of said merge units, microcode for said controller for said merge unit for providing control for said hardware accelerator means during a storage access, and a read and a write rotating means for rotating a word unit being transferred to or from said general register during a storage access.

13. A data processing system according to claim 1 wherein said storage array is provided with a general register, an address register and a control register for respectively receiving signals over an address bus and a control bus from said instruction processing unit, and wherein said hardware accelerator means includes as pad of said cross boundary buffer means a cross boundary buffer, and further includes both a read and a write merge unit a controller for each of said merge units, microcode for said controller for said merge unit for providing control for said hardware accelerator means during a storage access, and a microcode selection means responsive to the length of said multi-word operands for automatically selecting an appropriate microcode sequence.

14. A data processing system according to claim 1 wherein said storage array is provided with a general register, an address register and a control register for respectively receiving signals over an address bus and a control bus from said instruction processing unit, and wherein said hardware accelerator means includes as pad of said cross boundary buffer means a cross boundary buffer, and further includes both a read and a write merge unit, a controller for each of said merge units, microcode for said controller for said merge unit for providing control for said hardware accelerator means during a storage access, and a microcode sequencing means responsive to the length of said multi-word operands for automatically disabling a microcode sequence termination control specified in a microword until said multi-word operand has been completely accessed.

15. The data processing system according to claim 1 including rotating means for rotating an output of said storage array and operatively coupled to a data bus such that the first byte of data is positioned at a starting byte address.

16. The data processing system according to claim 15 wherein a bus register is provided, and means are provided for merging data in said bus register with data in a cross boundary buffer of said cross boundary buffer means during a storage access.

17. A data processing system having an instruction processing unit and a storage array organized on multi-word boundaries where a word is some number of consecutive bytes representing the basic unit of computation for a processor, comprising,
  an instruction processing unit (IPU); and
  a storage array (STORAGE),
  an interface between said storage array (STORAGE) and said instruction processing unit (IPU);
  said interface including an address bus (ABUS) which supplies a storage address from the instruction processing unit (IPU) IPU to said storage array (STORAGE), a control bus (CBUS) for providing a command which indicates the kind of storage address and whether the address is a read address, a write address, the length of the access in bytes, and a word byte boundary address (ABUS 29:31); said interface also including a data bus (DBUS), and a data bus out register (DBUSOUT) for said instruction processing unit (IPU);
  said instruction processing unit having a control store array (CS) which contains microwords which direct operations of the instruction processing unit (IPU) and storage array, a general register array (GR), an address register (AREG), a control register (CREG) and a read register (RREG), an instruction sequencing means (MSEQ) for fetching microwords from the control store array into a microinstruction register (MIR), an address generation adder (AGEN) having an output which includes a multi-word address (latched AREG 0:28) for addressing the storage array and said word byte boundary address (ABUS 29:31);
  a cross boundary buffer means including a cross boundary buffer (CBB) coupled to a rotating shifter, a merging means (WMERGE) and to a merge controller (WMCTL) which is coupled for an input to said control register (CREG); said instruction sequencing means (MSEQ) controlling data transmitted on said data bus for merge with data contained in said cross boundary buffer (CBB) of said cross boundary buffer means by said merger means before it is latched in said data bus out register (DBUSOUT) for said instruction processing unit (IPU) and for simultaneously also latching the data in said cross boundary buffer (CBB), and for writing data from said data bus out register (DBUSOUT) for said instruction processing unit (IPU) into the storage array (STORAGE) in the next clock cycle of said instruction processing unit at the multi-word address addressed by said multi-word address.

18. A data processing system according to claim 17 wherein said cross boundary buffer (CCB) means is coupled to a read rotating shifter (RROTATE), and there is provided a read merger means (RMERGE) and a read merger controller which responds to control signals in the control register (CREG), and wherein the said instruction sequencing means (MSEQ) on a read access generates a storage address which together with a command is latched in said address register (AREG) and said control register (CREG) respectively, and wherein in a subsequent cycle information in said address register (AREG) is used to read a multi-word from said storage array, said multi-word being latched in a provided read cross boundary buffer (CBB) and at the same time being passed through a provided read merger means (RMERGE) where it may be merged with data already in said read control boundary buffer, said merger means being under the control of said read merger controller (RMCTL).

19. A data processing system according to claim 17 wherein said cross boundary buffer means (CBB) is coupled to a write rotating shifter, write merging means (WMERGE) and a write merger controller (WMCTL) which is coupled for an input to said control register (CREG), said instruction sequencing means (MSEQ) controlling data transmitted on the data bus for merger with data contained in a write cross boundary buffer (CBB) of said cross boundary buffer means by said write merger means before it is latched in said data bus out register (DBUSOUT), and for simultaneously also latching the data in said write cross boundary buffer (CBB), and for writing data from said data bus out register (DBUSOUT) into the storage array (STORAGE) in the next clock cycle of said instruction processing unit at a multi-word address addressed by said multi-word address.

20. A data processing system according to claim 19 wherein said cross boundary 1Suffer (CCB) means has a read cross boundary buffer (RCCB) which is coupled to a read rotating shifter (RROTATE), and to a read merger means (RMERGE) and to a read merge controller which responds to control signals in the control register (CREG), and wherein the said instruction sequencing means (MSEQ) on a read access generates a storage address which together with a command is latched in said address register (AREG) and said control register (CREG) respectively, and wherein in a subsequent cycle information in said address register (AREG) is used to read a multi-word from said storage array, said multi-word being latched in said read cross boundary buffer (RCCB) and at the same time being passed through said read merger means (RMERGE) where it may be merged with data already in said read cross boundary buffer, said merger means being under the control of said read merger controller (RMCTL).

21. The data processing apparatus according to claim 1 wherein the instruction processing unit includes a microword from a control store to complete a transfer, said transfer being invoked on a microcode branch on a carry out of an adder.

22. The data processing apparatus according to claim 1 wherein the instruction processing unit includes a merge unit, and a merge control microword allows data transfer to be interrupted by other microwords and resumed at an arbitrary desired point.

23. The data processing apparatus according to claim 1 wherein the instruction processing unit includes a control store array which contains microwords which direct the operations of the instruction processing unit and storage, and a microsequencer, said microsequencer and a cross boundary buffer means providing residual accessing of multi-word operands of said system for executing for multiple words load multiple and store multiple instructions.

* * * * *